United States Patent [19]
Clayton, Jr.

[11] Patent Number: 6,076,678
[45] Date of Patent: Jun. 20, 2000

[54] TICK REPELLANT CARCASS BAG KIT

[76] Inventor: John M. Clayton, Jr., 1240 Bay Ave., Toms River, N.J. 08753

[21] Appl. No.: 09/280,928

[22] Filed: Mar. 29, 1999

[51] Int. Cl.[7] .................................................. B65D 69/00
[52] U.S. Cl. ........................... 206/579; 206/210; 206/484; 206/315.11
[58] Field of Search ................................... 206/579, 570, 206/205, 210, 572, 223, 229, 484, 440, 524.1, 315.11, 812

[56] References Cited

U.S. PATENT DOCUMENTS

| | | | |
|---|---|---|---|
| 3,702,677 | 11/1972 | Heffington | 206/205 |
| 3,836,045 | 9/1974 | Duhy et al. | 206/812 |
| 4,091,766 | 5/1978 | Colliard | 119/106 |
| 4,355,599 | 10/1982 | Fickes et al. | 119/106 |
| 4,409,116 | 10/1983 | Lodico | 252/91 |
| 4,511,533 | 4/1985 | Guadagno et al. | 206/219 |
| 4,582,685 | 4/1986 | Guadagno et al. | 206/205 |
| 4,778,048 | 10/1988 | Kaspar et al. | 206/205 |
| 4,844,251 | 7/1989 | Gueret | 206/222 |
| 5,058,738 | 10/1991 | Svensson | 206/229 |
| 5,320,772 | 6/1994 | Tricca | 426/321 |
| 5,368,158 | 11/1994 | Miaud | 206/222 |
| 5,988,371 | 11/1999 | Paley et al. | 206/229 |

*Primary Examiner*—Paul T. Sewell
*Assistant Examiner*—Nhan T. Lam
*Attorney, Agent, or Firm*—Louis E. Marn

[57] ABSTRACT

An animal carcass wrapping kit for use by hunters in the field to decrease the possibility of deer tick infection, the carcass wrapping kit having a wrap cloth positioned within a hermetically sealed housing member, the wrap cloth being impregnated with a deer tick repellant prior to its positioning within the hermetically sealed housing member or while in the hermetically sealed housing member immediately prior to use by way of a fracturable ampule of vial within the hermetically sealed housing member containing the deer tick repellant.

9 Claims, 2 Drawing Sheets

6,076,678

TICK REPELLANT CARCASS BAG KIT

BACKGROUND OF THE INVENTION

1. Field of the Invention

The present invention relates to a carcass bag for use by hunters, particularly deer hunters, and more particularly to a carcass bag in kit form wherein the carcass bag is impregnated with a deer tick repellant before packaging or can be impregnated with a deer tick repellant/insecticide immediately prior to use.

2. Description of the Prior Art

Hunting is a popular sport and many hunters particularly engage in deer hunting during the deer hunting season as regulated by the various states. In many instances, in the course of deer hunting, the deer is slain at some distance from the hunter's transportation. The hunter would therefore preferably field dress the deer at the location of the kill and then transport the carcass to suitable transportation or alternatively transport the entire carcass to the hunter's source of transportation for future field dressing. Thereafter, the hunter would transport the deer to another location for skinning and or aging and subsequent butchering of the deer. In many instances this second location is the home of the hunter.

In recent years, with the advent of Lyme Disease as carried by a deer tick, hunters have become more aware of the possibility of contracting this disease during the hunting season because of their actual contact with the deer carcass. The hunter may use a suitable repellant/insecticide (hereinafter referred to as repellant), on his clothing and on his exposed skin, however the close proximity to the deer carcass and the fact that the deer carcass is transported, normally to the home of the hunter, where it will hang for a period of time while being dressed, skinned, and aged, increases the possibility of deer tick infection and the advent of Lyme Disease. The hunter not only exposes himself to the disease because of his close proximity and manipulation of the deer carcass, but by transporting the deer carcass to his home, in his vehicle, the hunter may be inadvertently introducing the deer tick into his yard or home vicinity where heretofore it did not exist and where it might further infect non-hunters, such as children or other adults.

There is therefore a need for a simple and economical way for a hunter to protect himself from possible deer tick infection when handling the deer carcass and there is a further need to provide protection to non-hunters who may come into vicinity of the deer carcass when it is being dressed, skinned and aged. The solution to such a problem would have to be light weight and easily stored so as not to present a cumbersome article to the hunter since in most instances, the hunter will travel far from his means of transportation in order to hunt deer and then must transport She deer carcass back to his means of transportation. Since the hunter would already be carrying a weapon, ammunition, and suitable clothing for the time of year, the deer tick protection kit would have to be light weight and easily stored in a pocket for use a the proper time.

Applicant's carcass bag kit incorporates a light weight cloth material impregnated with a deer tick repellant and stored in a sealed container until use or alternatively, a light weight cloth material and a tick repellant in an impermeable, flexible plastic container such that the successful hunter can release the tick repellant from a vial or ampule contained within the impermeable, flexible container and permeate the carcass cloth with the tick repellant prior to removing the carcass cloth from the impermeable container and wrapping the deer in the carcass cloth. The deer carcass as wrapped can then be transported to the hunter's means of transportation and to the hunter's home with greatly reduced risk of deer tick bite or the advent of Lyme Disease.

OBJECTS OF THE INVENTION

An object of the present invention is to provide for a novel kit for use by a hunter which will allow the hunter to wrap a deer carcass with a cloth impregnated with a tick repellant.

A still further object of the present invention is to provide for a novel kit for a hunter which is convenient and can be easily carried by the hunter and utilized to prevent the spread of deer ticks in the event the hunter slays a deer.

A still further object of the present invention is to provide for a novel carcass bag kit for the prevention of the spread of deer ticks which carcass bag kit is easily manipulated to provide a carcass wrap cloth impregnated with a tick repellant.

SUMMARY OF THE INVENTION

An impermeable, flexible plastic container housing a wrap cloth for the wrapping of a deer carcass, the wrap cloth having been pretreated with a deer tick repellant or alternatively the container also housing a vial or ampule having a deer tick repellant contained therein, the vial or ampule being breached or opened while contained within the flexible, impermeable plastic container so as to impregnate the wrap cloth with deer tick repellant just prior to the removal of the wrap cloth from the impermeable flexible plastic container for wrapping the deer carcass.

BRIEF DESCRIPTION OF THE DRAWINGS

These and other objects of the present invention will become apparent, particularly when taken in light of the following illustrations wherein.

DETAILED DESCRIPTION OF THE DRAWINGS

Figure 1:
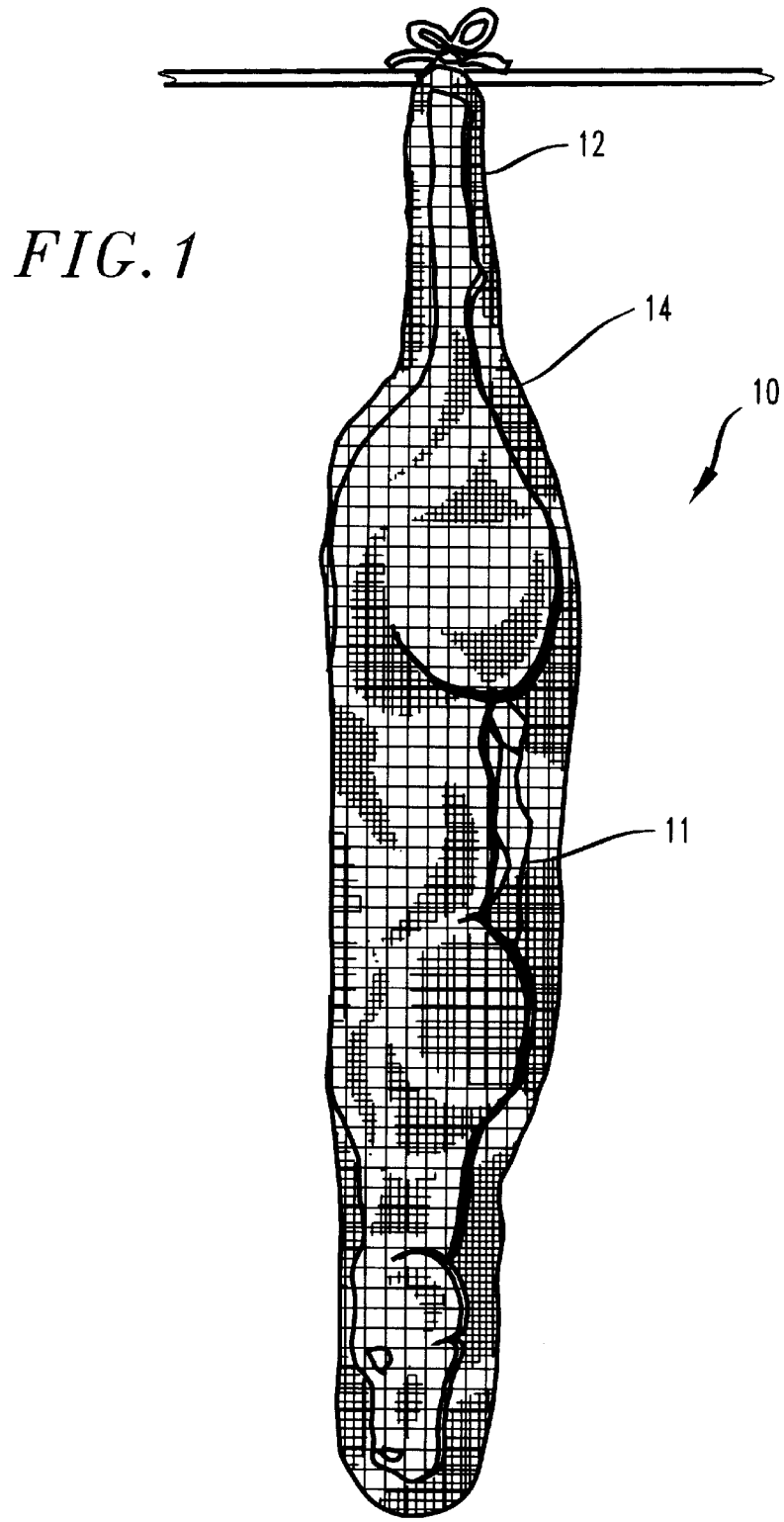
FIG. 1 is a front elevational view of a deer carcass with cloth wrap.
Figure 1:

FIG. 1 is a front elevational view of a deer carcass 10 and the manner in which it is hung after having been slain. The front legs 11 are normally tied close to the body with the rear legs 12 extended. FIG. 1 illustrates the deer carcass wrapped with a wrap cloth 14 which is the subject matter of the present invention and which would have been utilized to encapsulate the carcass on the field immediately after the deer was slain.

Figure 2:
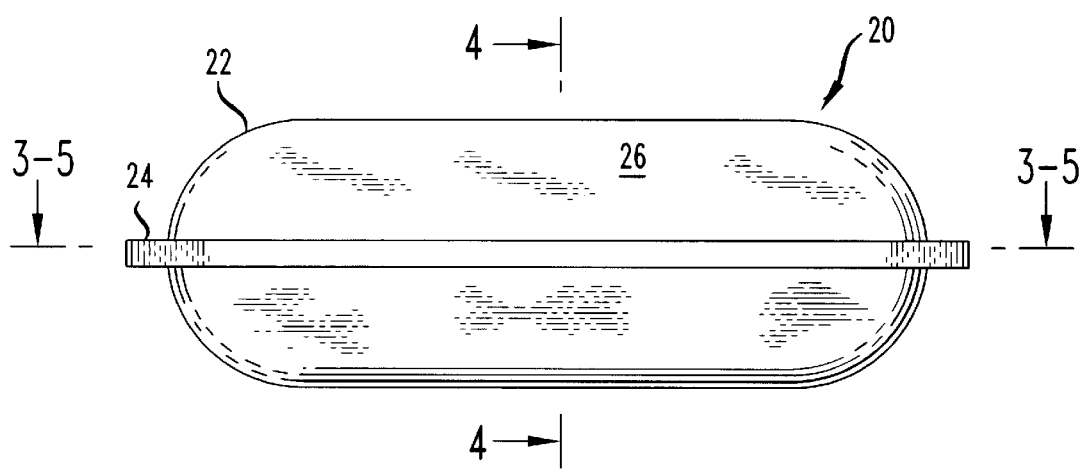
FIG. 2 is a front elevational view tick repellant carcass bag kit.

FIG. 2 is a front elevational view of the tick repellant carcass bag kit 20. The kit 20 would include an impermeable flexible plastic housing 22 formed of a suitable polymer such as polyethylene. Housing 22 is sealed about its perimeter edges 24 so as to form a pocket 26.

Figure 4:
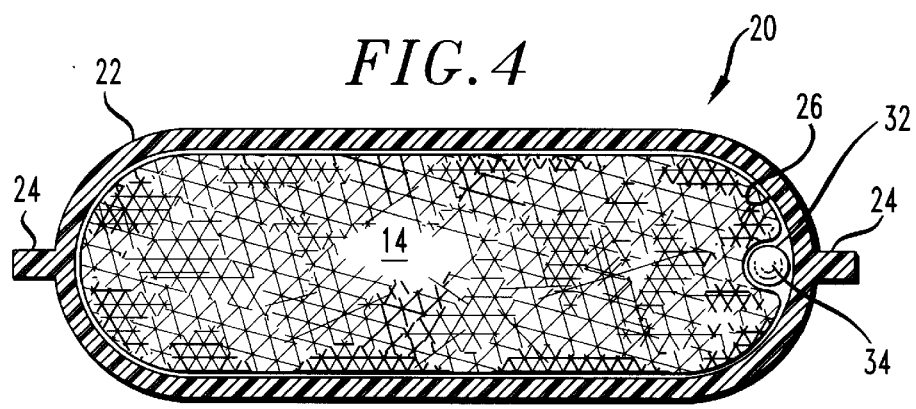
FIG. 4 is a side cutaway view along plane 4—4 of FIG. 2 of the tick repellant carcass bag kit.
Figure 3:
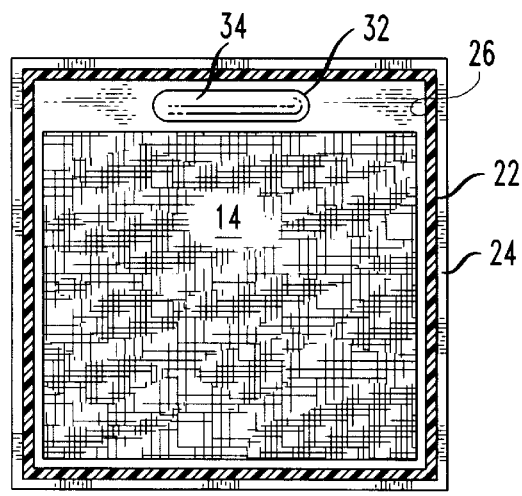
FIG. 3 is a top view along plane 3—3 of FIG. 2 of the tick repellant carcass bag kit.

FIG. 3 is a top cutaway view of housing 22 and FIG. 4 is a end cutaway view of housing 22. Positioned within housing 22 prior to the sealing of the perimeter edges 24, is wrap cloth 14 for the deer carcass. Wrap cloth 14 is of a light weight material and is folded over upon itself as evidenced in FIG. 4 so that a large area of cloth can be stored within a relatively small volumetric area. The cloth of choice, because of its light weight and permeability, would be a cheese cloth like material. Wrap cloth 14 may be pretreated with a deer tick repellant before at enclosure in housing 22 as illustrated hereafter in FIG. 5, however for greater efficacy at the time of wrapping the carcass, there would be positioned within pocket 26 of housing 22 be a vial or ampule member 32. Vial or ampule member 32 would contain a liquid tick repellant having the active ingredient Permethrin ((3-penoxyphenyl) methyl (+/−) cis/trans 3-(2,2 dichloroethynl) 2,2 dimethylcyclopropanocarboxylate) or equivalent thereof.

The vial or ampule 32 would be made of a suitable material so as to withstand normal wear and tear, but which would be easily breached or opened within pocket 26 while housing member 22 was still maintaining its sealed integrity by the application of bending or twisting action to the vial or ampule 32 by the fingers of the hunter. The tick repellant 34 released from ampule or vial 32 would be allowed to permeate the wrap cloth 14 while in sealed relationship within housing member 22. After a sufficient time, the perimeter seal 24 of housing 22 could be broken and the wrap cloth 14 now impregnated with the tick repellant 34, could be unwrapped and utilized to wrap the carcass of the deer as shown in FIG. 1. The vial or ampule 32 as well as opened housing member 22 could be stored in the hunter's pocket until a suitable trash receptacle was available for its discard.

The embodiment disclosed with respect to FIGS. 2, 3 and 4 is the most effective form of kit in that it insures that the repellant is impregnated in the wrap cloth 14 at a time proximate to and coinciding with the transportation of the deer carcass. Therefore the repellant impregnated wrap cloth 14 will be the most efficacious.

Figure 5:
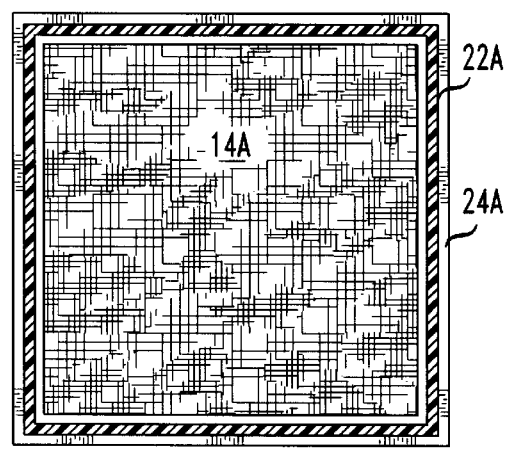
FIG. 5 is a top cut away view along plane 5—5 of a second embodiment of the carcass bag kit.

Alternatively, in a second embodiment, as illustrated in FIG. 5, a wrap cloth 14A is positioned within an identical housing member 22A being sealed about the perimeter edges 24A. In this embodiment, wrap cloth 14A has been impregnated with a repellant prior to its being sealed within housing member 22A. This presents an effective wrap cloth 14A for as long as housing member 22A is not subject to any breach with the outside ambient atmosphere which could cause the deterioration of the efficacy of the repellant.

While the present invention has been described with respect to the exemplary embodiments thereof, it will be recognized by those of ordinary skill in the art that many modifications and additions can be made without departing from the spirit and scope of the invention. Therefore it is manifestly intended that the invention be limited only by the claims and equivalents thereof.

I claim:

1. An animal carcass wrapping kit for use by hunters in the field to decrease the possibility of deer tick infection, said kit comprising:

a hermetically sealed housing member;

a wrap cloth for wrapping said animal carcass positioned within said housing member;

a fracturable ampule positioned within said housing member, and in communication with said wrap cloth, said fracturable ampule having contained therein a deer tick repellant, said fracturable ampule upon fracture permeating said wrap cloth with said deer tick repellant prior to removal of said wrap cloth.

2. The wrapping kit in accordance with claim 1 wherein said deer tick repellant comprises (3-penoxyphenyl) methyl (+/−) cis/trans 3-(2,2 dichloroethynl) 2,2-dimethylcyclopropano-carboxylate.

3. The wrapping kit in accordance with claim 1 wherein said housing member comprises an impermeable, flexible plastic envelope.

4. The wrapping kit in accordance with claim 1 wherein said wrap cloth comprises a light weight absorbable cloth sized to envelop said animal carcass.

5. The wrapping kit in accordance with claim 4 wherein said wrap cloth comprises cheese cloth.

6. An animal carcass wrapping kit for use by hunters in the field to decrease the possibility of deer tick infection, said carcass wrapping kit comprising:

a hermetically sealed housing member;

a wrap cloth for wrapping said animal carcass, said wrap cloth contained within said housing member, said wrap cloth further being permeated with a deer tick repellant prior to enclosure in said housing member, said deer tick repellant comprising 3-penoxyphenyl) methyl (+/−) cis/trans 3-(2), 2 dichloroethynl) 2,2-dimethylcyclopropano-carboxylate.

7. The wrapping kit in accordance with claim 6 wherein said housing member comprises an impermeable, flexible plastic envelope.

8. The wrapping kit in accordance with claim 6 wherein said wrap cloth comprises a light weight absorbable cloth sized to envelop said animal carcass.

9. The wrapping kit in accordance with claim 7 wherein said wrap cloth comprises cheese cloth.

\* \* \* \* \*